United States Patent [19]

Quick, Jr.

[11] 4,427,548
[45] Jan. 24, 1984

[54] FILTERING METHOD AND APPARATUS

[75] Inventor: Joe A. Quick, Jr., Midland, Mich.

[73] Assignee: The Dow Chemical Company, Midland, Mich.

[21] Appl. No.: 337,359

[22] Filed: Jan. 6, 1982

[51] Int. Cl.³ .............................................. C02F 3/04
[52] U.S. Cl. ................................. 210/617; 210/150; 210/169; 210/903; 119/3
[58] Field of Search ........ 210/150, 151, 169, 615–618, 210/284, 275, 266, 621, 622, 903; 119/3

[56] References Cited

U.S. PATENT DOCUMENTS

| | | | |
|---|---|---|---|
| 2,364,298 | 12/1944 | Kamp | 210/150 |
| 3,929,630 | 12/1975 | Smith | 210/617 |
| 4,067,809 | 1/1978 | Kato | 210/169 |

FOREIGN PATENT DOCUMENTS

| | | | |
|---|---|---|---|
| 761830 | 7/1971 | Belgium | 210/150 |
| 54-24455 | 2/1979 | Japan | 210/616 |
| 56-13014 | 2/1981 | Japan | 210/169 |
| 627525 | 8/1949 | United Kingdom | 210/618 |
| 582808 | 12/1977 | U.S.S.R. | 210/284 |

*Primary Examiner*—Benoit Castel
*Attorney, Agent, or Firm*—M. W. Barrow

[57] ABSTRACT

A marine and fresh water filtration and polishing method and apparatus which provides mechanical filtrations; improved removal of chlorinated hydrocarbons, ammonia, and nitrite; aeration; and optionally is capable of buffering water and removing organic compounds from it. Invention operates by removing water from process aquarium or tank, and passing it in a trickle filter fashion through an open-cell polymeric foam material.

5 Claims, 3 Drawing Figures

FILTERING METHOD AND APPARATUS

FIELD OF THE INVENTION

This invention relates to improved filtering and polishing of marine, brackish, or fresh water.

BACKGROUND OF THE INVENTION

The invention is especially useful for conditioning aqueous medium in aquariums wherein aquatic life such as fish, lobsters, shrimp and other marine life are grown and maintained for domestic or commercial purposes.

It should be understood that aquariums as used herein is not limited to the small, about 1-10 cubic feet, sized containers often seen in homes for decoration or hobby purposes, but they also include the much larger containers used for marine life habitats often referred to as tanks, including commercial above- or below-ground tanks containing hundreds, thousands, and millions of cubic feet of water.

It should also be understood that the method and apparatus of this invention are useful in removing ammonia or nitrite from certain industrial wastewater streams.

Marine aquarists have long recognized the problem of buildup of nitrogen compounds. In the aquarium, toxic nitrogen compounds, especially ammonia, are the products of decomposition of various organic materials among which are uneaten food; slime, excrement, and urine from marine life; and various microorganisms. Some of these materials may be excreted directly by organisms also. Even well-managed aquaria usually contain three to six times the normal amount of nitrogen compounds found, for example, in natural sea water. Older established aquaria may contain ten times or more the normal amount of these compounds. This is an unnatural condition imposed upon marine organisms, for in their native habitats natural nitrogen cycling processes keep dissolved nitrogen compounds down to very low levels. Over long periods of time, excessive buildup of toxic nitrogen compounds in artificial environments affects marine fishes adversely such as by reducing their resistance to diseases, thereby decreasing their life spans or by killing them directly. Normally, ordinary marine filter materials such as charcoal, chalk, etc., do not significantly detoxify or remove these common nitrogen compounds.

Many other filtering solutions have been sought which would maintain the water of an aquarium as close as possible to that of the natural water. The marine life sought to be maintained in the aquariums is adapted to and does best in water like that of its natural habitat. These filtering methods have included passing the aquarium water through open-cell polymeric foam. See, for example, the following patents: U.S. Pat. No. 3,957,017; U.S. Pat. No. 3,347,211; U.S. Pat. No. 3,578,169; U.S. Pat. No. 3,891,555; G.B. Pat. No. 1,262,625; U.S. Pat. No. 4,076,619; U.S. Pat. No.3,301,402; U.S. Pat. No. 2,539,768; and U.S. Pat. No. 4,076,619. It will be seen from a study of these patents that although they teach the use of such polymeric foam material and the like as a filtering agent for aquariums, they nevertheless all teach their use when the foams etc. are submerged.

SUMMARY OF THE INVENTION

It has been found according to the present invention that such filtering agents can be made to perform the additional essential nitrogen compound detoxification function when they are not submerged in the water in or from the aquarium; that is when they are used in a trickle-filter fashion. Much greater detoxification action (5-30 times as much on an equal volume basis) is achievable with this invention.

It has also been discovered the trickle-filtering process ad trickle-filtering apparatus of this invention are useful in removing ammonia and nitrite from industrial chemical process wastewater streams.

STATEMENT OF THE INVENTION

This invention is a method and an apparatus for filtering and detoxifying aquarium water and wastewater streams. The method comprises flowing water from the aquarium downwardly through a non-submerged, porous, open-cell material whose non-submerged part is exposed to the air or other mixture containing gaseous oxygen. Preferably the water is flowed through several alternating layers of oxygen and such non-submerged, open-cell, porous filtering material.

Preferably this porous, open-cell material is a polymeric foam, and more preferably it is a non-rigid, polymeric foam so that it can be easily handled when removing and cleaning the filter. Open-cell polyurethane foam has been found particularly suitable. However, this is not to say that rigid, nonpolymeric, porous materials such as open-cell silica foam or other very high surface area materials cannot also be used as a filter material. Such high porosity materials could include polymer fibers, hollow fiber polymers, porous calcium carbonates from coraline algae, processed plant fibers, coconut charcoal, glass flakes, and the like (pore diameters 2 $\mu$m to 800 $\mu$m). Of course, for aquarium use, these filter materials should be non-toxic to the aquatic life which the water these materials filter is designed to support. This non-toxicity requirement does not necessarily extend to non-biological uses such as wastewater processing.

In certain instances it is desireable to add nitrifying bacterial innoculant (e.g. Nitrosomonas and Nitrosococcus genera) to the water or directly to the foam in order to speed up the naturally occuring and necessary establishment of such bacteria in the foam. Techniques for the handling of such bacteria are well known to those skilled in the art and need not be discussed here.

The apparatus of this invention is a single or multilayer trickle water filter comprised of at least one top filter tray and preferably one or more lower filter trays located beneath said upper tray and supporting it in a manner such that the trays are stacked one atop another. The top tray will be summarized first. It differs in essence from the lower trays only in that it does not require a means to support a filter tray above it since there is no such higher filter tray to support. Of course, this upper tray can have such support means, and often does, inasmuch as the upper trays are usually reproductions of the same tray design as the lower ones simply to avoid the extra cost of producing a separate design.

The top filter tray is comprised of a frame in which a layer of filter material rests. This filter material, is a layer of the porous, open-cell material. Preferably it is a flexible foam so that it can be taken out and squeezed and flexed to more easily clean it. Coarse, open-cell, polyurethane foam has been found particularly suitable.

Some device, such as a spray head or perforated pipe, is used to distribute incoming water relatively evenly across the top of the layer of porous material.

The upper filter tray has in its bottom a grate, perforated plate, bars, or other structure which is capable of supporting the filter material contained in the upper tray. This supporting structure also has openings in it through which water, which has passed downwardly through the filter material, can continue its downward passage, passing downwardly out of the bottom of the upper filter tray. The filter material, located in the upper filter tray is supported by the support structure in such a manner that water discharged onto the top of said filter tray will pass by gravity flow through said filter and on out of the bottom of the filter tray through the openings in its filter material without submerging the filter material. The top of said filter material is exposed to natural or artificial oxygenated atmosphere so that the water trickled into the top of the upper filter tray is at least partially aerated, and, more importantly, so that oxygen can reach the aerobic nitrifying bacterial community living in the foam.

The lower filter trays will now be summarily discussed. Essentially, a lower filter tray differs from the top filter tray in that each lower filter tray has a means to support the tray above it, and further, to support the supported tray sufficiently far enough above the filter material of the supporting tray so that oxygen can freely circulate in the space above the filter material and below the supported tray in the same manner and for the same purpose as described above for the upper filter tray. Of course, the lower trays have sides, and these sides may have openings above the tops of the filter material to allow air to circulate in and out of the lower filter tray. Alternatively, the system may be sealed such that air, oxygen, or other oxygenated gas may be forced under pressure through the porous filter material to further enhance the detoxification rate. Such forced ventilation may occur in any direction but upward through the filter material has been found superior in most cases.

The processed detoxified water leaving the last tray in the stack may fall directly back into the aquarium or other tank. Or, it may be collected in a reservoir and pumped or drained to the receiving vessel.

Many other benefits are found to exist using the present invention. For example, certain polymeric foams will remove halogens and/or halogenated organics from water contaminated by such substances. Such foams are urethanes and chlorinated polyethylenes. Of course, the water is aerated using this invention. Also the foam of this invention accomplishes the removal of excess carbon dioxide from water containing such excess carbon dioxide as well as the removal of free chlorine from water containing free chlorine. The water can be buffered by the use of calcium carbonate, dolomite and the like located upon or within the foam. Organic material can be further removed by the use of activated charcoal or carbon on or within the foam. Undesired ions in the water can be removed by the use of ion exchange resins or zeolites within or upon the foam. The gases used to aerate the filter unit may be chosen to alter the acidity or alkalinity of the throughput water, for example by adding small amounts of $CO_2$ or HCl. Or, gas mixtures may be chosen to remove undesirable gases from the throughput water. For example, an oxygen-helium mixture will remove nitrogen gas.

The method and apparatus of this invention will be better understood from the three figures of the drawing wherein like parts have the same reference numerals.

DETAILED DESCRIPTION OF THE PREFERRED EMBODIMENT

Figure 1:
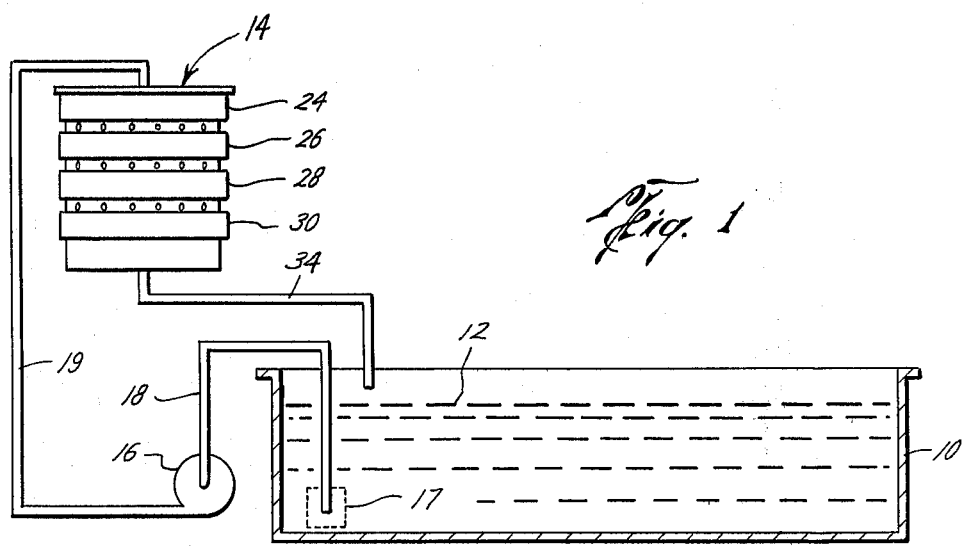
FIG. 1 is an elevation of a typical water filter-polishing aquarium system showing the aquarium of the system in section.

Referring to the drawings, an aquarium-filter-polisher system can be seen in FIG. 1. This system includes an aquarium 10 containing aquarium water 12 in which aquatic life (not shown) lives.

The system also includes a mutli-layer filter-polisher 14 and associated pipes and pump. Pump 16 sucks water from aquarium 10 via pipe 18 and flows it into the top of multi-layer filter-polisher 14 via pipe 19 which is connected to distributor pipe 20, inside filter polisher 14 (see FIG. 2).

The inlet of pipe 18 inside aquarium 10 is in the water 12, and has a sieve or mesh covering 17 to prevent fish, etc., from being sucked into pipe 18 and pump 16. It is preferred to have an opaque top 21 covering the top of the filter-polisher 14 to reduce the light inside. This light reduction inhibits the growth of algae on the foam 36 in the top filter section 24. Top 21 has a slot cut in it to allow it to be fitted around pipe 19 (FIG. 2).

Figure 2:
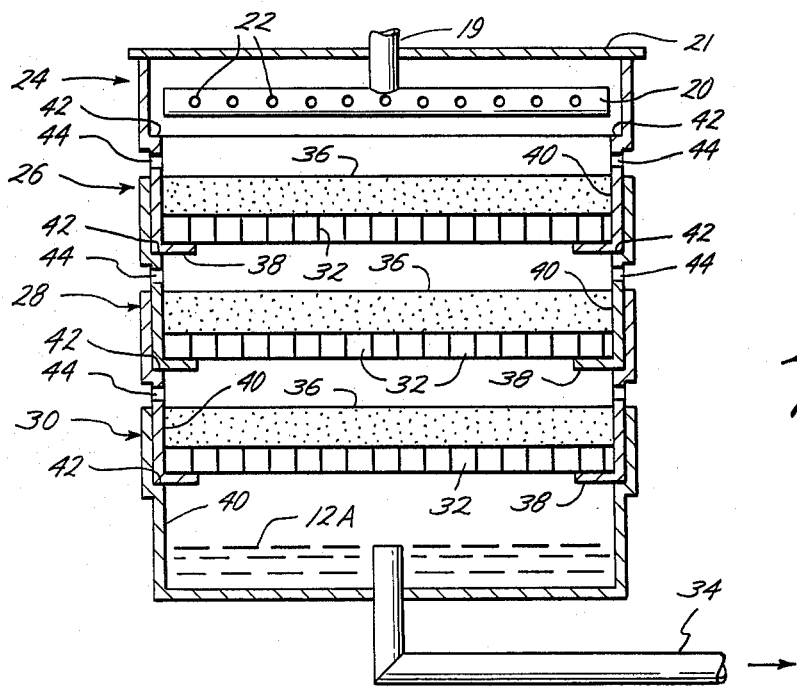
FIG. 2 is an enlarged cross-sectional side view of the water filter-polisher of the system of FIG. 1.

Water is distributed inside the top of multi-layer filter-polisher 14 via openings 22 (FIG. 2) in distributor pipe 20 at a flow-rate such that it will trickle filter down through the three stacked filter trays or filter sections 24, 26, 28 shown in FIGS. 1 & 2. The filtered and detoxified water is then collected in the collector section 30 as represented by water reservoir 12A. Collection section 30 is located underneath filter sections 24, 26, 28, and supports them. From collector section 30 the water 12A is then gravity flowed back into aquarium 10 via pipe 34.

In multi-layer, filter-polisher 14, filter sections 24, 26, 28 and collector section 30 are nested in a vertical stack. Inside each filter sections 24, 26, 28, near their bottom, is located a flat layer of foam filter material 36. These foam filter layers are an open-cell, water-wettable, non-toxic porous material such as polyurethane foam. Filter foam layers 36 are supported in each filter section 24, 26, 28 by grates 32.

Figure 3:
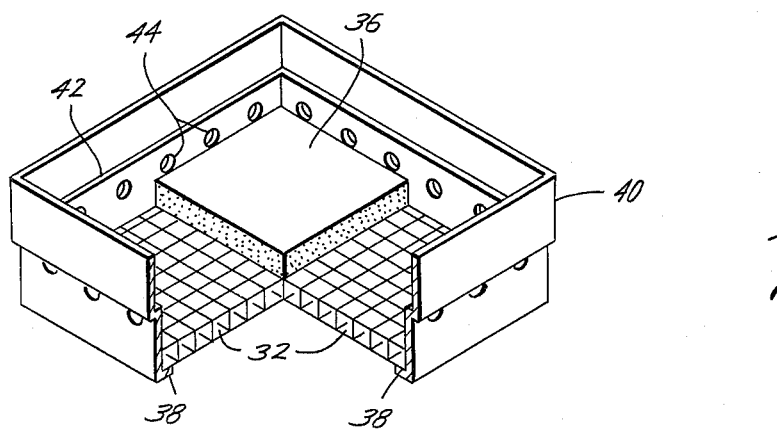
FIG. 3 is a partically broken away, isometric view of one of the middle filter sections of the filter-polisher shown in FIGS. 1 and 2.

Grates 32 are rigid, grate-like structures whose purpose is to support foam layer filters 36 in the bottoms of filter sections 24, 26, and 28 and to distribute downward-falling water horizontally across the surface of the next lower foam layer 36. Grates 32 are supported by horizontal footings 38. Footings 38 are part of the vertical side-walls 40 of filter sections 24, 26, and 28. Side walls 40 are not flat, but rather each has its upper section offset outward from its lower section in order to form horizontal ridge 42 (FIG. 3). The purpose of horizontal ridge 42 is to provide a support means for the filter section stacked above it. Collector section 30 has a similar ridge 42 in its side walls to support filter section 28 above it. By supporting the filter sections in this manner, a space can be provided between the bottom of a foam filter 36 in one filter section from the foam filter 36 in the filter section beneath it. This allows trickle filtrations to be accomplished for each of the foam filters 36. Trickle filtration of course is the filtering of a liquid at a flow-rate sufficiently slow so as not to submerge the filters.

Fresh air or gaseous oxygen is allowed to contact the foam filters 36 through entry into each of the filter sections 24, 26, 28 via air openings 44. Air openings 44 are located in the sides 40 of filter sections 24, 26 and 28 above their respective foam filter layers 36. The holes or air openings 44 located in filter sections 26 and 28 are located below the bottom of the filter section which their respective filter section supports above it. That is the openings 44 in filter section 26 are located below the bottom of filter section 24, and the openings 44 in filter section 28 are located below the bottom of filter section 26. Therefore, via air openings 44, air communication is established between the atmosphere outside said filter sections and the space provided above the filter foam layer 36 in each of the filter sections 24, 26, 28. Of course, filter section 24 is also supplied with an air supply from above since there is no other filter section located above it to prevent air from entering its interior through its open top. Thus, filter section 24 needs no openings 44, but they are present because it is convenient to have the filter sections made alike.

Three filter sections are shown in the drawings, but, of course, more or less of these sections can be used as desired to achieve the desired purity of water quality.

Using the above described method and system, heavy loadings of penaeid shrimp in up to six 100-gallon tanks have been maintained beyond their normal life expectancy using a single filter-polisher unit of 12 by 18 by 24 inches high. Ammonia and nitrite levels were maintained below analytical detection limits of 0.01 and 0.4 parts per million respectively.

In another application, superior growth was maintained among hundreds of shrimp in two 1,400-gallon capacity tanks serviced by a similarly sized filter-polisher unit.

In a similar application with a filter polisher of only a single foam layer design, halogenated hydrocarbon contaminants (clordane and heptaclor) were removed along with toxic nitrogen compounds (ammonia and nitrite) from a 2,000-gallon tank cotaining over 80 pounds of living fishes.

I claim:

1. An improved method of detoxifying aquarium water which comprises:
   a. removing water from the aquarium;
   b. flowing this removed water downwardly through a plurality of alternating layers of air and porous, open-cell polymeric foam layers located one beneath the other with sufficient spacing between the foam layers to allow free circulation of air in and out of the air layers, each of said foam layers having an aerobic nitrifying bacterial community living in it and the flow rate of the downwardly flowing water being maintained sufficiently slow enough so as not to submerge the porous foam layers as it trickles through them;
   c. collecting the water at the bottom of the foam layers after it has passed through them; and
   d. returning the collected water to the aquarium.

2. The method of claim 1 wherein the foam is flexible polyurethane.

3. The method of claim 1 wherein the foam is non-rigid polyurethane.

4. The method of claim 1 wherein $Ca_2CO_3$ is deposited on or within at least one of the foam layers.

5. A multi-layer trickle filter for polishing water from aquarium water comprised of:

A. A top filter tray and at least one lower filter tray located beneath and supporting said upper tray in a manner such that the trays are stacked one atop the other;

said top tray being comprised of a frame in which contains a layer of a filter material of porous, open-cell polymeric foam, said foam layer having an aerobic intrifying bacterial community living in it; said top tray having a grate in its bottom in a manner so that it supports said polymeric foam layer, said grate also having openings in it through which said aquarium water which has already trickled downwardly by gravity flow through the foam layer can continue its downward passage by gravity flow to the next tray with at least the top portion of said foam layer being exposed to the atmosphere;

said lower filter tray or trays being like said top filter tray with the further requirement that each lower filter tray further comprises (1) means to support the trays above its polymeric foam filter material at a distance sufficiently great so as to form a chamber in which air can circulate, and (2) said lower trays having holes in their support means for the tray above it so that air can pass in and out of said chamber through the holes in it;

B. a water inlet at the top of the top filter tray; and
   C. a water outlet at the bottom of the lowest filter tray.

* * * * *

UNITED STATES PATENT AND TRADEMARK OFFICE
CERTIFICATE OF CORRECTION

PATENT NO. : 4,427,548

DATED : January 24, 1984

INVENTOR(S) : Joe A. Quick, Jr.

It is certified that error appears in the above—identified patent and that said Letters Patent is hereby corrected as shown below:

Col. 2, line 8; "ad" should be --and--.

Col. 4, line 21; "mutli-layer" should be --multi-layer--.

Col. 5, line 47; "cotaining" should be --containing--.

Col. 6, line 30; "intrifying" should be --nitrifying--.

Signed and Sealed this

Tenth Day of July 1984

[SEAL]

Attest:

*Attesting Officer*

GERALD J. MOSSINGHOFF

*Commissioner of Patents and Trademarks*